US008117608B1

(12) United States Patent  
Slettehaugh et al.

(10) Patent No.: US 8,117,608 B1
(45) Date of Patent: Feb. 14, 2012

(54) SYSTEM AND METHOD OF PROVIDING MOBILITY TO PERSONAL COMPUTERS

(75) Inventors: Aaron Slettehaugh, San Francisco, CA (US); Kyle Poole, San Francisco, CA (US); Bryan Grziwok, Oakland, CA (US); Phil Halbert, San Francisco, CA (US)

(73) Assignee: RingCube Technologies, Inc., Mountain View, CA (US)

( * ) Notice: Subject to any disclaimer, the term of this patent is extended or adjusted under 35 U.S.C. 154(b) by 1291 days.

(21) Appl. No.: 11/516,179

(22) Filed: Sep. 5, 2006

Related U.S. Application Data

(60) Provisional application No. 60/714,753, filed on Sep. 3, 2005.

(51) Int. Cl.
*G06F 9/44* (2006.01)
(52) U.S. Cl. ........................................................ 717/163
(58) Field of Classification Search .................. 709/204, 709/200, 217, 229, 231, 220; 455/560, 456.3, 455/556.1, 422.1, 414.1; 713/2; 726/16; 370/395.54; 717/163–178; 711/103; 714/25
See application file for complete search history.

(56) References Cited

U.S. PATENT DOCUMENTS

| 6,947,965 | B2 | 9/2005 | Glass |
| 6,970,866 | B1 | 11/2005 | Pravetz et al. |
| 6,988,163 | B2 * | 1/2006 | Malueg et al. ................ 711/103 |
| 7,320,024 | B2 | 1/2008 | Oku |
| 7,356,679 | B1 | 4/2008 | Le et al. |
| 7,424,709 | B2 | 9/2008 | Neiger et al. |
| 2002/0010756 | A1 | 1/2002 | Oku |
| 2002/0147810 | A1 | 10/2002 | Traversat et al. |
| 2003/0028612 | A1 * | 2/2003 | Lin et al. ....................... 709/217 |
| 2003/0054810 | A1 * | 3/2003 | Chen et al. .................... 455/422 |
| 2004/0179537 | A1 * | 9/2004 | Boyd et al. ............... 370/395.54 |
| 2005/0004968 | A1 * | 1/2005 | Mononen et al. ............. 709/200 |
| 2005/0021695 | A1 | 1/2005 | Takamine |
| 2005/0021788 | A1 | 1/2005 | Tucker et al. |
| 2005/0114448 | A1 * | 5/2005 | Skomra ......................... 709/204 |
| 2005/0246453 | A1 | 11/2005 | Erlingsson et al. |
| 2005/0278569 | A1 * | 12/2005 | Srinivasan et al. .............. 714/25 |
| 2005/0289216 | A1 | 12/2005 | Myka et al. |
| 2006/0021029 | A1 | 1/2006 | Brickell et al. |
| 2006/0155931 | A1 | 7/2006 | Birrell et al. |
| 2006/0168153 | A1 * | 7/2006 | Lin ................................ 709/220 |
| 2006/0258341 | A1 * | 11/2006 | Miller et al. ............... 455/414.1 |
| 2007/0050770 | A1 | 3/2007 | Geisinger |
| 2009/0025006 | A1 | 1/2009 | Waldspurger |

OTHER PUBLICATIONS

Sapuntzakis, S.P. et al., "Optimizing the Migration of Virtual Computers," 2002, ACM SIGOPS Operating Systems Review, vol. 36, pp. 377-390.

\* cited by examiner

*Primary Examiner* — Tuan Anh Vu
(74) *Attorney, Agent, or Firm* — Banner & Witcoff, Ltd.

(57) ABSTRACT

A user-centric computing system that includes a mobile storage device ("MSD") capable of interfacing with a client personal computer ("PC") for the purpose of using certain resources available through the client PC to access user programs, applications, data, and settings stored on the MSD. The user-centric computing system may also include a software management program configured to select the user programs, applications, data and settings to be stored on the MSD from the user programs, applications, data, and settings installed on a user's PC and to interface with the client PC. A method of providing mobility to a user PC by selecting programs installed on the user PC and storing the selected programs on an MSD and interfacing the MSD with a client PC is also provided.

14 Claims, 5 Drawing Sheets

SYSTEM AND METHOD OF PROVIDING MOBILITY TO PERSONAL COMPUTERS

CROSS-REFERENCE TO RELATED APPLICATIONS

This application claims the benefit of U.S. Provisional Application Ser. No. 60/714,753 entitled "Mobile Personal Computer System," filed Sep. 3, 2005, by inventors Aaron Slettehaugh, Kyle Poole, Bryan Grziwok, and Phil Halbert, which application is incorporated herein, in its entirety, by this reference.

BACKGROUND OF THE INVENTION

1. Field of the Invention

The invention is generally related to a system and a method of providing user-centric computing. In particular, the invention relates to a mobile storage device capable of interfacing with a personal computer ("PC") for the purpose of using certain resources available through the PC to access user programs and data stored on the mobile storage device.

2. Related Art

In general, a personal computer ("PC") may be considered a microcomputer whose price, size, and capabilities make it suitable for personal usage, where the personal usage may be both business and non-business related. Prior to the widespread use of PCs, the functions the PC now performs were performed by mainframes, minicomputers, or time-share terminals connected to a central computer.

The PC now is capable of running many different programs and applications, including those programs and applications requiring large amounts of memory and processing power, and the software industry is constantly developing new programs and applications to perform general purpose tasks, such as word processing, internet browsing, internet faxing, e-mail and other digital messaging, graphics, multimedia playback, video game play, etc. Thus, each PC is truly "personal" in that its user may have many specific programs installed on his PC that are necessary to his business or used regularly for entertainment or personal purposes.

Therefore, when the user, for example, has to travel, he still requires access to his own PC. One method of accomplishing this is to access the PC remotely via the Internet, but this requires an Internet connection, which may not always be available, and may also be limited by the available bandwidth. Another method is to store programs and data on a central server, but this has the drawback of a possible lack of data security as well as limitations when there are a large number of data and programs to be stored.

Consequently, there is a need for a system and a method whereby a user's PC is user-centric, i.e., the user may access his own PC through any available PC using a locally-connected mobile storage device so that the latter PC operates as if it were the user's PC.

BRIEF SUMMARY OF THE INVENTION

A system and a method for providing portability to a personal computer utilizing a mobile storage device capable of interfacing with other personal computers, substantially as shown in and/or described in connection with at least one of the following figures, as set forth more completely in the claims is disclosed.

Various advantages, aspects and novel features of the present invention, as well as details of an illustrated embodiment thereof, will be more fully understood from the following description and drawings.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION OF THE INVENTION

Figure 1:
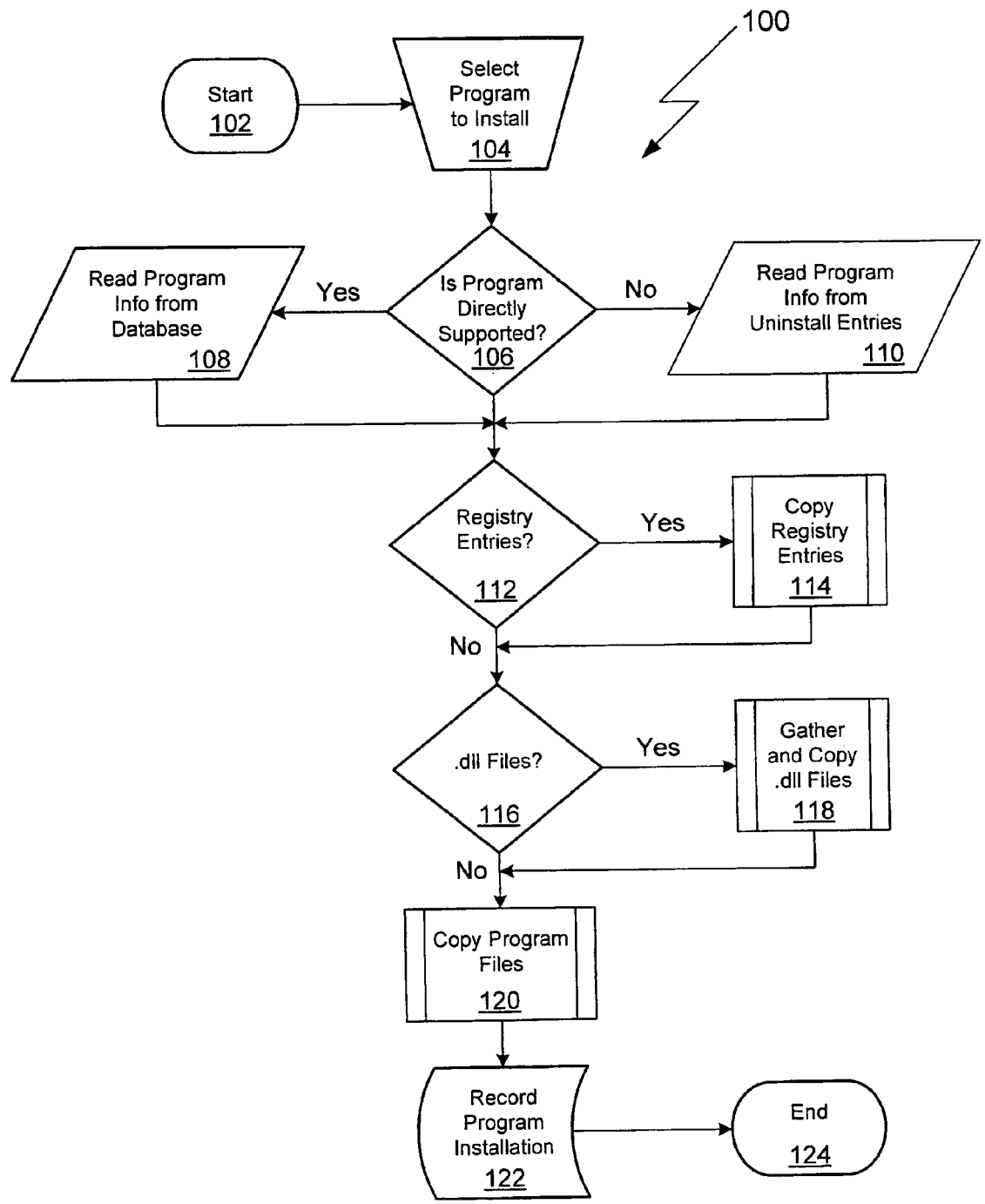
FIG. 1 shows a flow diagram illustrating an example of a process whereby a mobile storage device selects programs stored on a PC and stores the selected programs on the mobile storage device in accordance with the invention.

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

In general, the invention relates to a user-centric computing system that includes a mobile storage device ("MSD") capable of interfacing with a personal computer ("PC") for the purpose of using certain resources available through the PC to access user programs and data stored on the MSD. The MSD may be any external device capable of storing data, including by way of example, an external hard drive, an external flash memory, a personal digital assistant, a cell phone, or any other similar device having storage capabilities.

A PC means any system having user interface capabilities, a microprocessor and an operating system ("OS"). The interface capabilities may include a display, such as a screen, a monitor, or other similar device, and a user input device or mechanism, such as a touch screen, a mouse, a keyboard, a voice recognition system, or other means for inputting information. As used in this specification, a PC may include a terminal machine having a screen, keyboard, microprocessor, an OS and, optionally, an internet connection.

In general, the user-centric computing system separates a PC's hardware interface, the operating system and the processing power from those aspects of a PC that are truly personal, such as programs, data and software interface(s). The user-centric computing system may include an MSD that allows a user to use any PC as if it were his/her own PC. For purposes of this specification, the PC with which the MSD interfaces may be referred to as either a "client" or a "client PC," and a user's own personal PC may be referred to as a "user PC."

The MSD may interface with the client PC through a wired or wireless connection, including, but not limited to, serial, parallel, USB, wireless-USB, FireWire, WAN or LAN connections or Wi-Fi, Bluetooth, infrared, 802.11 or other means of wireless connectivity. When the client PC interfaces with the MSD, a software management program may be launched that manages the relationship between the MSD and the client PC. This software management program may be launched by the user or may automatically launch when the MSD and the client PC are placed in communication with one another. The software management program may reside on the client PC, on the MSD, or in part on both the client PC and the MSD.

The general purpose of the software management program is to allow a user to interface with any client PC via the MSD and have the client PC operate as if it were the user's own PC. In other words, the software management program allows the MSD the ability to utilize certain hardware and/or software components/modules of the client PC for the purpose of accessing and/or processing personalized programs and data contained on the MSD.

In one example implementation, the software management program may provide the user with his/her own desktop interface that provides the user with access to all of his/her data and programs that are stored on the MSD. Thus, the software management program may operate to allow personal programs located on the MSD to run from that device as if they were installed on the client PC itself.

In another implementation, the MSD may be a device having wireless or wired Internet or network communication capabilities, other forms of connectivity, or any combination thereof. In this case, the MSD may access/receive personal data, programs, applications, settings, or any combination thereof stored remotely. Thus, MSDs that may not be capable of storing all of a user's personal data or upon which storing such data may not be desirable, may still be utilized.

Alternatively, the MSD may use available network communication capabilities to retrieve and/or access personal data stored remotely. As an example, the MSD may have a software virtual private network stored on that device that, when launched, can establish a connection to a remote server via the Internet. Such Internet access may be obtained via the client PC or directly by the MSD. In a case such as this, personal data resident on the remote server may be retrieved in addition to personal data stored on the MSD.

When the MSD is plugged into a communication interface, such as a USB port, of a PC, the user may see his/her own custom interface and may access all of his/her programs and data residing on the MSD. Thus, users may store and carry only what is unique to them and leave behind that which is found in ubiquity, such as hardware (e.g., screen, keyboard and mouse) interfaces, operating system(s), and processing power.

Current mass-storage devices allow customers to use all their data anywhere, but users are still tied to a single machine for their own user-specific applications, such as Outlook, Quicken, or iTunes, which represent only a few of many examples of user-specific applications. With the MSD, users may use these or any other applications on any machine and will always see the same user interface. Further, the MSD may even retain user settings and customizations for non-user specific applications like Word and Excel. Such retained user settings may include, but not be limited to, toolbars, spell check dictionaries, and other customizations. The MSD may also directly carry non-user specific applications themselves, in addition to their custom settings. The software management program on the MSD manages the relationship between the MSD and the client PC to allow applications to be run from the MSD as if they were installed on the client PC itself.

This changes the computing paradigm from location/machine-centric to user/customer-centric, as PCs become generic terminals. "My computer" becomes simply "a computer" that anyone can use as their own machine when they plug in the MSD. Conceptually, it is the same as the network computer except that a customer's data, programs, and applications are stored on his/her portable drive, i.e., the MSD, rather than on the server, as they are in a network-centric model. Rather than carrying a large, heavy laptop computer, all a user will need to carry is the MSD. Thus mobile computer usage could now involve the use of desktop computers, which are much faster and more powerful than laptops.

The MSD may interface with home and/or office PCs, including terminals (with a screen, keyboard, processor, OS and internet connection). The MSD may also interface with terminal and/or PC computers provided in public locations, such as airports, cafes and meeting/presentation rooms. The MSD may be also be used on airplanes if the seat-back screen is designed to include, or modified to connect to, a computer. As an example, the MSD may interface with the seat-back screen and flight attendants can hand-out keyboards, similar to the manner in which they hand out head-phones (if the MSD is absent a user interface).

As examples of other possible uses, an MSD may also incorporate Bluetooth (or some other wireless standard) in which case, one's MSD may not even need to be removed from one's purse or bag for use. Users may also be able to sit in a hotel room with their MSD still stored in a bag and use the LCD TV as a monitor and a keyboard that interfaces with a PC terminal in the room either wirelessly or via a wired connection.

Additionally, the MSD may be preloaded with programs/applications that may be customized by the user from any PC or may be customized through copying programs/applications already resident on a user's PC. For example, when an MSD is plugged into a user PC, the installation program may invite the user to choose to copy a program already installed on his/her desktop onto the MSD. Further, the MSD installation program may allow a user to copy his/her existing software, documents, e-mail, and contact lists. Further, the MSD may detect any registry changes and record what changes must be made to enable the program to work on client PCs.

In FIG. 1, a flow diagram illustrating an example of a process whereby a user selects those programs/applications installed on his PC, which may be a desktop personal computer or a laptop or notebook PC, that are to be stored on an MSD. The process 100 starts in step 102, and in step 104, the user selects those programs/applications installed on the user PC that will be stored on the MSD. As an example, starting with the Windows® 2000 OS, a list of installed programs/applications on a desktop PC can be found in the registry entry "HKEY_LOCAL_MACHINE\SOFTWARE\Microsoft\Windows\CurrentVersion\Uninstall." This registry information contains both the displayed program name as well as the full path to the program. The "\Program Files" directory may also be checked for any programs that do not already appear in the registry. The list of available programs is then displayed to the user.

In decision step 106, a determination is made as to whether the selected program is directly supported. Information about the most commonly used programs may be gathered to ensure compatibility and stored in a database, and the program name as taken from the registry is compared to a list of supported programs stored in the database. If the program is directly supported, the required program information is read directly from the database in step 108. This information may include information about the registry entries to read, how to determine the full path to the program, and what directories and additional dynamic link libraries (".dll") files to copy.

If the program is not directly supported, it may still be possible to copy the program files from the path given in the uninstall registry entry. This is done in step 110, where a "best guess" approach may be used to determine if the program in question might have any registry entries associated with it, by searching for a close match to the program name in the registry under "HKEY_LOCAL_MACHINE\SOFTWARE" and "HKEY_CURRENT_USER\Software." It may be assumed that the program does not require any additional .dll files to operate; however, the user may manually copy the files to the MSD if the selected program fails to run. Alternatively, the "best guess" approach may include a fuzzy search of all registry entries and .dll files to find matches to the name of the executable or any of the folders in its path name. A further alternative may be to run a virtual installation process and monitor all registry and .dll files associated with that program. Or in some other cases, the user may need to install programs directly to the MSD, rather than moving it from the client PC.

After either step 108 or step 110, the process 100 goes to step 112, where the Windows® registry is checked for entries. Programs often store user settings and path information in the Windows® registry. In order for the selected program to operate correctly on a different PC with the custom settings intact, these registry entries must be copied along with the program files. In step 114, these registry entries are copied to a database on the MSD.

Programs often require .dll files, which contain shared code that can be used by multiple programs. The .dll files are usually copied to the Windows® System directory so that only the latest version of the .dll file is kept. In decision step 116, a determination is made as to whether any .dll files are required, and if they are, they are gathered and copied to the database on the MSD in step 118.

In step 120, the program files are copied to the MSD in an unencrypted form, so that they may be directly executed on a different PC as if the MSD were an external hard drive. When the program has been successfully copied, a database of installed programs is updated in step 122, so that later the user can be presented with a list of installed programs available to run. If there are other programs to be selected, the process 100 repeats itself; otherwise the process 100 ends at step 124.

Upon interfacing an MSD to a client PC, the OS of the client PC will usually detect that a new drive is available and the MSD's software management program will then be launched and run from the MSD whenever the software management program resides entirely or in part on the MSD. Upon execution, the software management program will present the user with his/her own desktop interface, which will enable the user to access all of his/her data and programs on the MSD. For security purposes, the software management program, once launched, may prevent the user from accessing the programs, data or settings residing on the client PC. Further, the software management program may also overlay the interface of the client PC.

When a user launches a program from the MSD, the MSD's software management program may update the client PC's registry and then run the program directly from the MSD. Thus, the user experience may be exactly the same as on his/her own user PC, e.g., a home computer, including the personalized settings.

During the operation of the software management program, temporary files may be stored directly on the MSD, and thus, no trace of the MSD's use of the client PC will be left on the client PC. When a user is finished, he/she may close the MSD's software management program, or simply disconnect or close the connection between the MSD and the client PC, e.g., disconnect the USB connection. The software management program may then restore the registry settings on the PC and delete any other data left behind by the MSD's use of the client PC. When the MSD's software management program is shut down/closed, the MSD may no longer be accessed through the client PC, even if it is still physically connected to the client PC.

Figure 2:
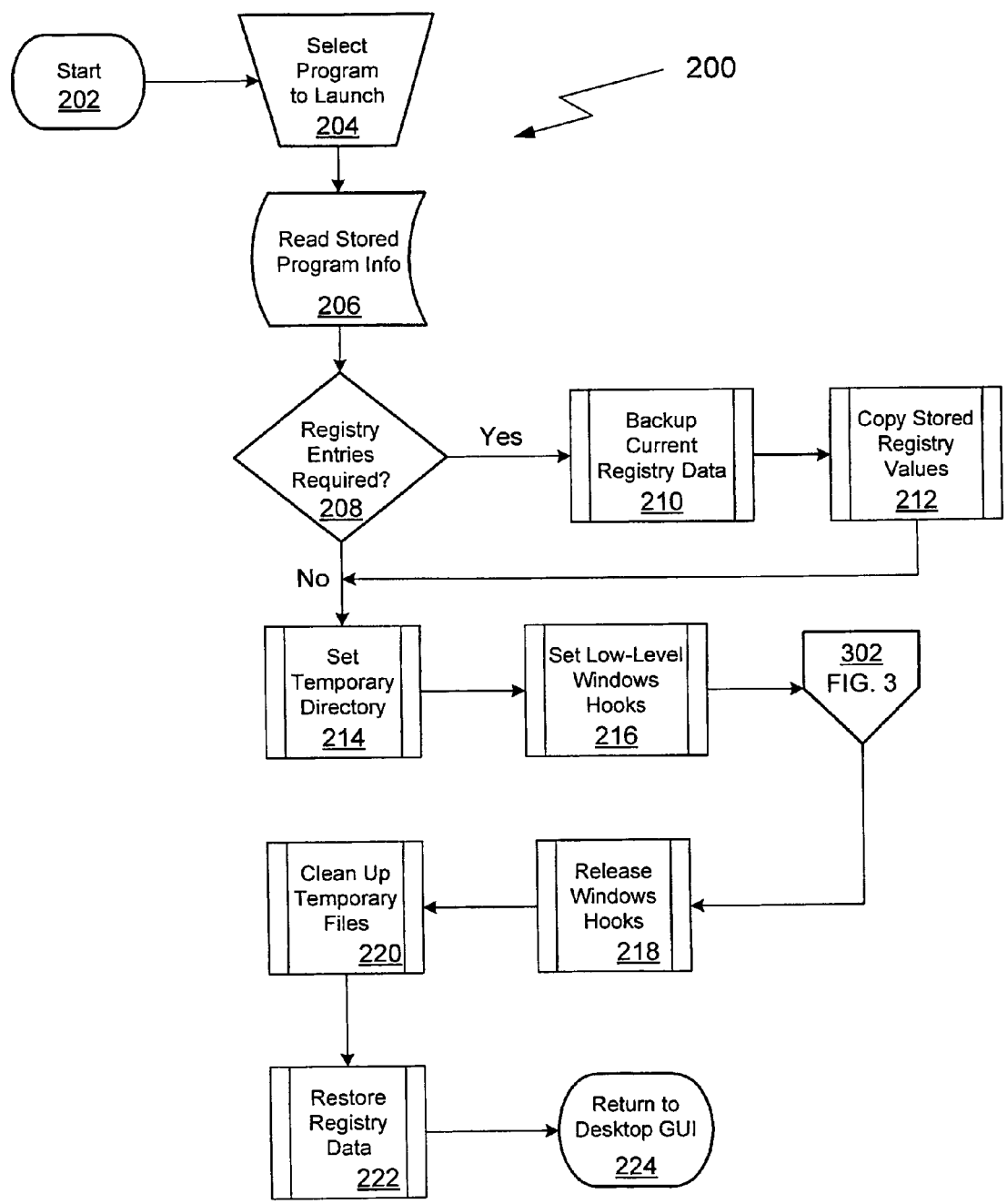
FIG. 2 shows a flow diagram illustrating an example of a process whereby a user of a mobile storage device selects and launches programs stored on the mobile storage device in accordance with the invention.

Turning to FIG. 2, a flow diagram illustrating an example of a process whereby a user launches a program stored on an MSD interfaced with a client PC. The process 200 starts in step 202, and in step 204, the user selects a program that is stored on the MSD to be launched. In step 204, the software management program reads the database of currently installed programs and presents a list of available programs to the user for selection. Once a program is selected, the required information about the selected program is read from the database, including the registry entries to copy and any specific program settings, in step 206.

In decision step 208, a determination is made as to whether registry entries are required. If the program requires registry entries for the program install path or custom user settings, the copied, registry values from the user PC, e.g., the original desktop PC, must be transferred from the MSD to the client PC for proper program operation. In step 210, to preserve the client PC's settings if the program in question is already installed on the client PC, a copy of the current client registry data is saved to a temporary file.

In step 212, the stored registry values are copied from the MSD to the client PC. The required registry entries as read from the database are first updated, to reflect any drive letter changes. As an example, "C:\Program Files\AppName" may need to be changed to "E:\Program Files\AppName," where E: is the Windows® drive letter assigned to the MSD. This will allow the program to execute properly on systems that may have a different number of installed drives. The registry values are then copied into the client PC's registry.

To minimize the footprint left behind on the client PC, the Windows® temporary directory (usually "%SystemRoot%\Temp") is set to a directory on the MSD. The temporary directory is set by changing the registry entries "HKEY_LOCAL_MACHINE\SYSTEM\CurrentControlSet\Control\SessionManager\Environment\TEMP" and "HKEY_CURENT_USER\Environment\TEMP." Alternatively, these files could be put on the client PC, along with a basic program to restore settings. This is done in step 214.

In step 216, in order to over-ride default Windows® behavior, such as hiding drives on the PC and automatically encrypting user data saved to the MSD, low-level Windows® system hooks are installed. These hooks can override the operation of any Windows® application programming interface ("API"), allowing the MSD client program to process requested system commands and either change the behavior, cancel the request, or pass the command on to the operating system for execution.

Figure 3:
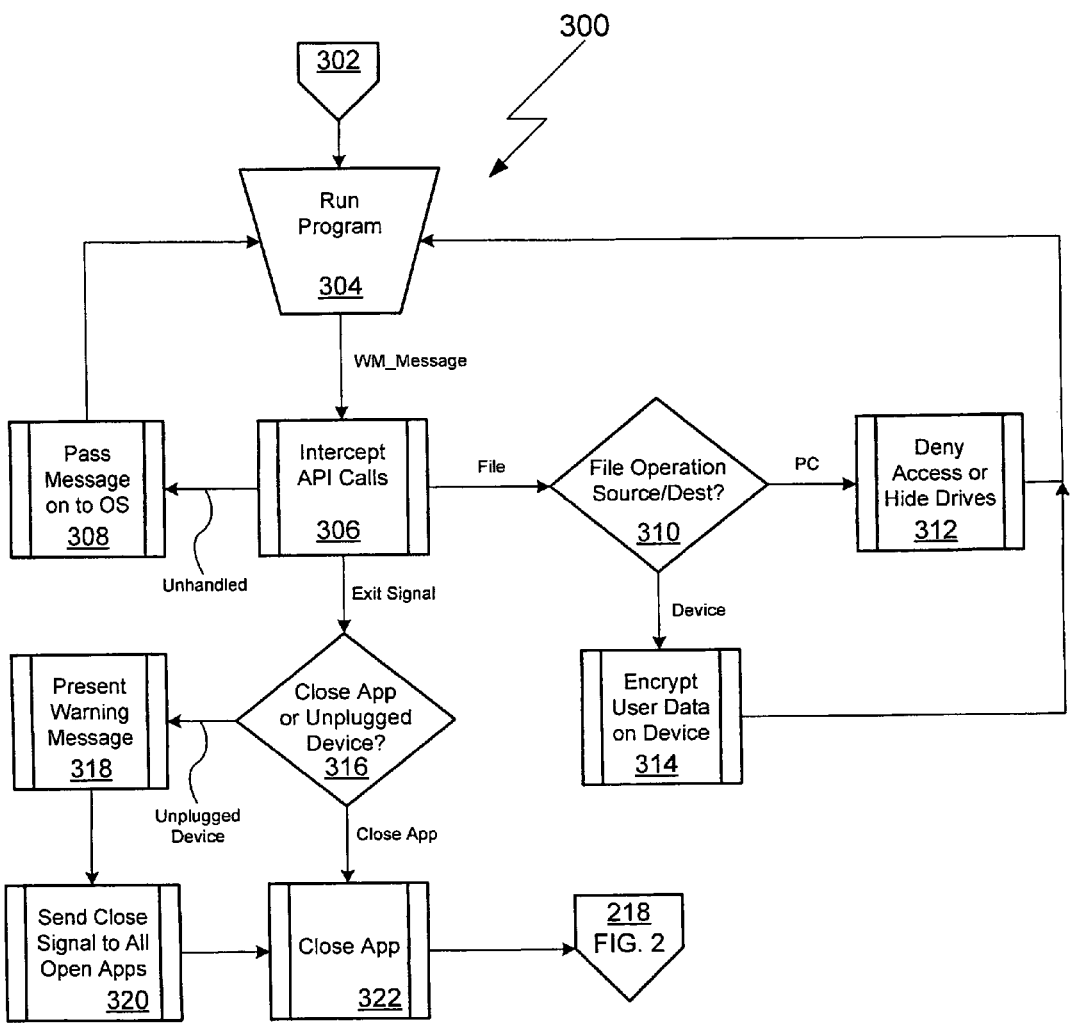
FIG. 3 shows a flow diagram illustrating an example of a process whereby, after the launching of a program, the program is run utilizing a mobile storage device in accordance with the invention.

Upon the completion of step 216, the selected program may be run as shown in FIG. 3. Upon completion of the process 300 shown in FIG. 3, there is a return to step 218, and to restore the system to its original state, the Windows® hooks are released, and programs can then operate normally. In step 220, temporary files created on the MSD are deleted and in step 222, the changed registry data is deleted, and the saved original registry data (if any) are copied back to the client PC. If the temporary files and restoration program are stored on the client PC rather than the MSD, then even if the MSD is unplugged without proper shutdown, this restoration program may access the temporary files and restore the client PC to its original state, and then clean itself up. In step 224, the process 200 ends and the user is returned to the client PC GUI.

In FIG. 3, a flow diagram illustrating an example of a process whereby a program is launched directly from an MSD in accordance with the invention is shown. The process 300 starts in step 302, which occurs after the installation of low-level Windows® hooks in step 216, FIG. 2. In step 304, the program is launched directly from the MSD, and it appears to the user exactly as it would on the user's own PC, e.g., a home desktop PC, with all the custom settings intact.

In step 306, the installed Windows® hooks will intercept and process all API calls and Windows® messages. The hooks are at the system level, which means that the program will be sent the command request before the OS has a chance to process it. If the API call or message is not processed by the MSD, i.e., it is unhandled, it is passed on to the OS for execution in step 308. Otherwise, if the API call is a file operation, the source or destination of the operation is checked in decision step 310. The program should have no access to the client PC, read-only access to the program directory on the MSD, and encrypted read/write access to the user data directory on the MSD.

If the file operation involves a drive on the client PC, the operation is denied access in step 312 and the process 300 returns to step 304. This is the default security level to ensure that the owner of the client PC is confident that the MSD user cannot access their personal data or otherwise affect their system. Additionally, when a list of drives is requested, in a "File Open" dialog for example, the drives on the client PC are hidden, and only the MSD drive is available. On the user's own computer, the security level may be set to allow full access to his PC so that he is not restricted from modifying his own computing system.

If the file operation involves the MSD, and the location is the program files directory, access is enabled in a selective read/write mode in step 314, meaning that access is granted to create or change the settings of files, but write access to program executables is denied to prevent spreading viruses. Also in step 314, if the file operation involves the user data directory on the MSD, the data is encrypted in real-time to provide an extra layer of security if the MSD is lost or stolen.

If a program close signal is detected, or the MSD is unplugged, this will be detected in decision step 316, and certain clean-up tasks need to take place to ensure that the client PC is left unaffected. If the MSD has been unplugged without closing programs, in step 318 the user is presented a warning message that they can not save their work unless the MSD is plugged back in, and in step 320, a signal to shut down is sent to all other open programs.

From both step 320 and step 316, the process may arrive at step 322, where the program is allowed to close normally. The process 300 then ends by returning to step 218, FIG. 2.

In alternative implementations, the MSD software management program may be sold as an independent product and installed on any external storage media including, but not limited to, hard disk drives, flash memory and CD-RW. The MSD software management program may reside on the client PC rather than the external media, or it may reside in both locations.

In an example of a hardware implementation of an MSD, the MSD may be a hard disk drive that may have its PC interface integrated into the MSD itself. The MSD may also have one or more ports to interface other devices to itself or to the client PC, or both. Additionally, the MSD may be encased in a durable, rubberized material, resulting in a portable device that is impervious to any damage that may occur in transit.

Figure 4:
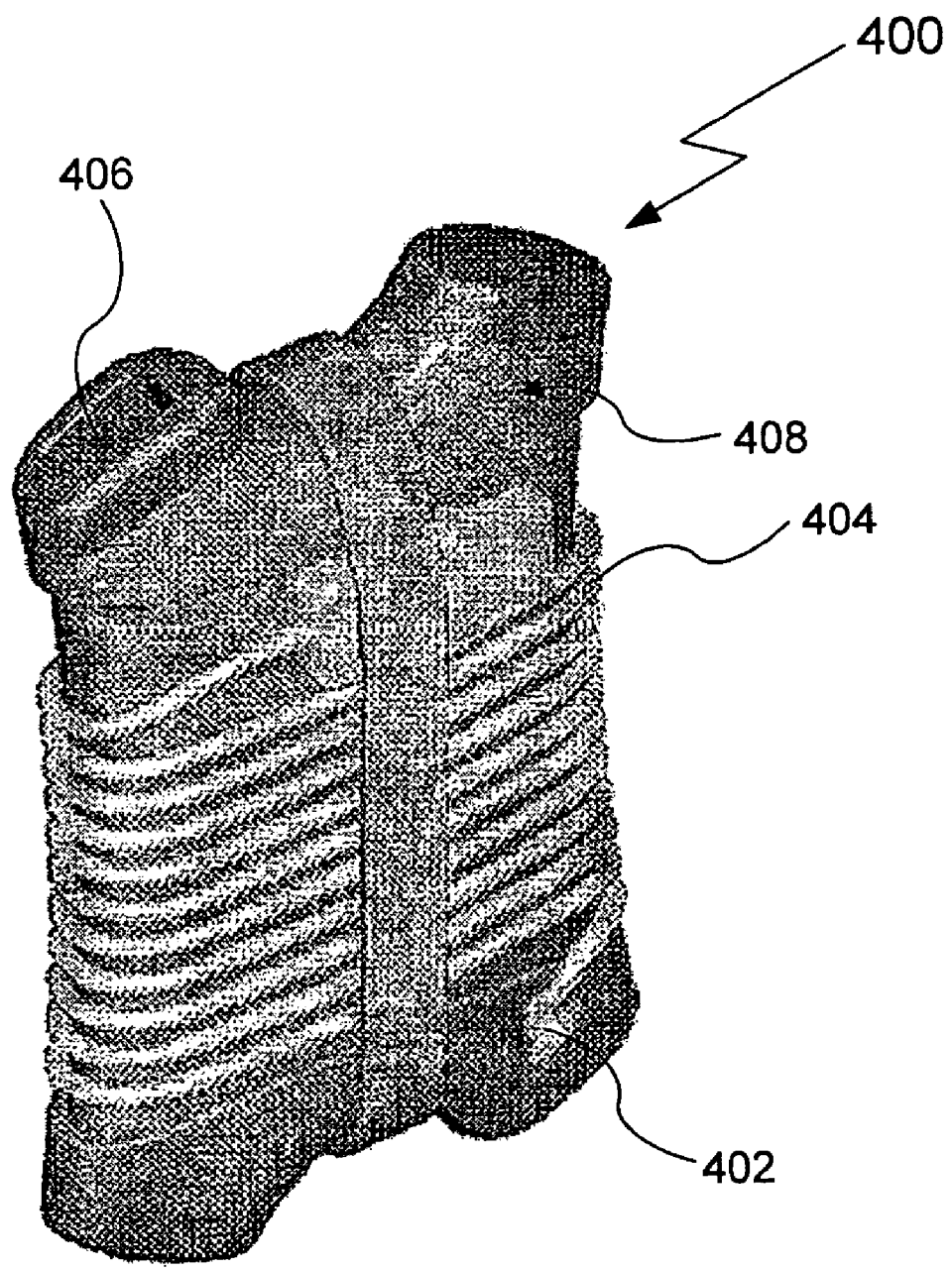
FIG. 4 shows a sketch illustrating an example of a hardware implementation of an MSD together with an integrated PC interface.

A sketch illustrating an example of a hardware implementation of an MSD having an integrated PC interface is shown in FIG. 4. The MSD 400 may have a USB port 402 and a built-in USB cord 404. The MSD 400 may also have a second port 406 to interface other devices to itself or to the client PC or to both. The MSD may include within its durable, rubberized surface 408 a hard disk drive ("HDD") (not shown). As an example, the HDD may be a 1.8" 40 GB external hard drive, with a rotational speed of 4,200 RPM.

The MSD 400 may also have a power buffer (not shown) that allows it to operate even if it does not receive enough power to operate at its full power requirements. This power buffer may be a rechargeable battery, where the battery charges when the MSD is using less power than its power source provides. When the MSD requires more power than the source provides, it may supplement or substitute this power source with power from the battery.

Figure 5:
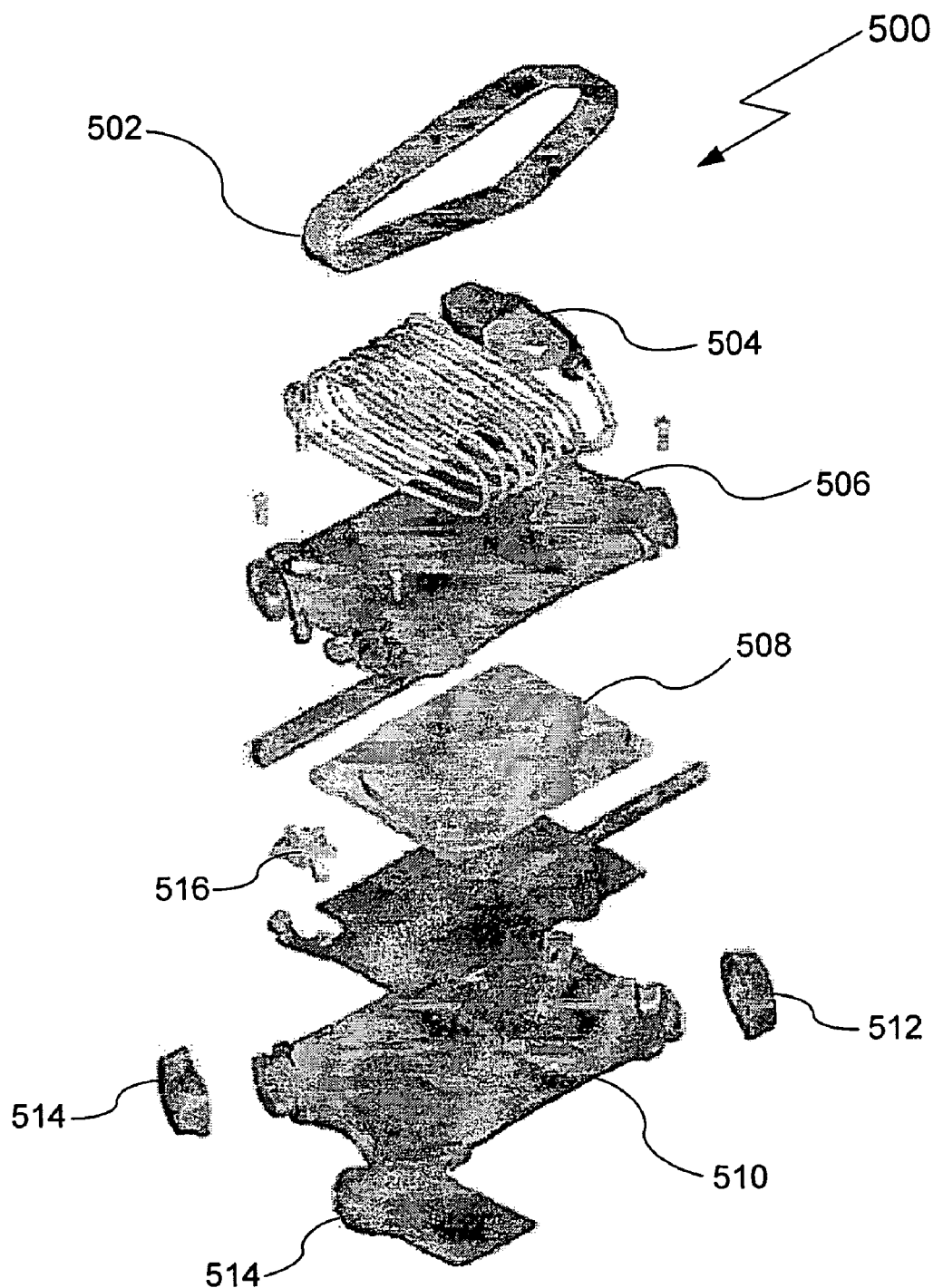
FIG. 5 shows a sketch illustrating an exploded view of the hardware implementation of the MSD shown in FIG. 4.

FIG. 5 shows a sketch illustrating an exploded view of the hardware implementation of the MSD shown in FIG. 4. The MSD 500 includes a top case 506 and a bottom case 510, which when connected together forms a case that encloses an electronic assembly 508. A bracelet 502 may be placed around the top case 506 and a bottom case 510 when assembled, and the MSD 500 may also include a USB cord 504. The MSD 500 may also include a USB boot 512 as well as one or more boots 514 that allow for additional ports to be added later. The MSD 500 may also include a light pipe 516 with an LED (not shown) to indicate the drive status.

Hardware implementations of the MSD should not be limited to implementation in an external hard drive, as described above, nor should an implementation using an external hard drive be limited to the example hard drive specifications set forth above. Those skilled in the art will recognize that memory size, connectivity type, and other external hard drive features may be modified, added or excluded during implementation depending on particular use requirements, pricing limitations, or other factors that may affect implementation decisions.

The MSD may also be implemented on other mass storage devices, such as, for example, flash memory, or any other device that has storage capabilities, including, but not limited to, MP3 players, PDAs, and smart phones. Palmtop versions of programs may allow users to view and edit any of the files on the MSD without connecting to a client PC. Further, the user may be able to output directly from the MSD without connecting to a client PC, such output including, but not limited to, printing, showing presentations, and/or sending or receiving data to and/or from any other device.

There are other features and processes that may be included with the implementations described above. For example, to provide additional security, a desktop component to the program that installs only under administrative privileges and recognizes the client PC as that of MSD owner's PC (or that recognizes the MSD as the PC owner's MSD) may also be included. The user can set various security levels. In the default mode, the MSD cannot access data and programs on the client PC, thus protecting the client and the MSD from having data or programs copied from it or altered by a guest using an MSD. However, on the user's own computer (or multiple computers), the additional access allows him to transfer programs to the MSD as described in FIG. 1, and to modify data, programs and settings to his own computer though the MSD.

Further, this program may back-up the client PC's hard disk to the MSD, back-up the MSD hard disk to the client PC, or both. Further, it may synchronize data, programs and/or settings between the MSD and the client PC. This may be done with one or more client PC's, and one or more MSDs. For example, a client PC may recognize several MSDs and back-up each MSD to itself or synchronize user data between the PC and the MSD. Further, a MSD owner may back-up or synchronize to multiple client PCs. In summary, a program may be designed that allows for the exchange of data, programs, applications, and/or settings between the PC and the MSD in accordance with the rules of the program or rules set by the owner of the PC and/or the MSD.

The MSD may also include security software and/or hardware. In the case of security software, the security software may be included as a feature of the software management program or it may be a separate program stored on the MSD. Alternatively, the security software may also be loaded on a client PC, in which case, the client PC may control the security aspects of an MSD's use of the client PC.

The security software may protect the MSD so that a client PC cannot access the MSD's programs or data. The security software may also prevent the MSD from leaving any "fingerprints," i.e., evidence that it was plugged into the client PC or any information about the MSD or its user. The security software may also protect the MSD from security risks including, but not limited to, viruses and worms, regardless of the firewall and virus protection level of the client PC.

The security software may also protect the client PC from viruses or any other harmful data or programs on the MSD. Further, it may prevent access to the client PC settings, data, programs or anything else contained on or connected to the client PC. The security software may also allow varying levels of access to the client PC for different users: full access for some users, partial access to the client's data, programs, applications, settings, connections and peripherals for others, and no access for some users.

Persons skilled in the art will understand and appreciate, that one or more processes, sub-processes, or process steps described in connection with FIGS. 1, 2, and 3 may be performed by hardware and/or software. Additionally, the user-centric computing system described above may be implemented completely in software that would be executed within a processor or plurality of processors in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions (i.e., "logic" that may be implemented either in digital form such as digital circuitry or source code or optical circuitry or chemical or biochemical in analog form such as analog circuitry or an analog source such an analog electrical, sound or video signal), and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (herein known as a "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer (i.e., machine) data signals embodied in the carrier wave signal. The computer/machine data signals may include data or software that is transported or interacts with the carrier wave signal.

While the foregoing descriptions refer to the use of a user-centric computing system utilizing the Windows® operating system, the subject matter is not limited to such use. Any system or component that could benefit from the functionality provided by the components and processes described above may be implemented as the elements of the invention.

Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention.

What is claimed is:

1. A method of providing mobility to a personal computer ("PC") of a user ("user PC") via a mobile storage device ("MSD") and a client PC, the client PC being distinct from and remotely located from the user PC, the method comprising:

executing, using a processor of the user PC, steps to:
receive a selection from the user via the user PC of one or more programs installed on the user PC; and
store the selected one or more programs on the MSD including:
determine whether the selected one or more programs require registry entries or custom user settings stored in a registry or dynamic link library (".dll") files on the user PC, and
if the selected one or more programs have registry entries or custom user settings stored in the registry or .dll files, store the registry entries or custom user settings and .dll files in a database on the MSD to enable the selected one or more programs to be executed utilizing the client PC as if the selected one or more programs were installed on the client PC;

in response to the MSD being interfaced with the client PC by the user, executing, using a processor of the client PC, steps to:
receive a selection from the user via the client PC of at least one of the one or more selected programs stored on the MSD to launch;
launch the selected at least one of the one or more selected programs stored on the MSD, said launch including determine if registry entries and .dll files are required to run the selected at least one of the one or more selected programs stored on the MSD, and if registry entries are required:
update the registry entries stored on the MSD for compatibility with the client PC;
copy original registry entries from the client PC to temporary files on the MSD or the client PC, the access privileges of the user for the client PC permitting the copying of the original registry entries from the client PC; and copy the updated registry entries and the .dll files stored on the MSD to the client PC, the access privileges of the user for the client PC permitting the copying of the updated registry entries and .dll files to the client PC; and run the launched at least one of the one or more stored selected programs utilizing the client PC, the client PC being compatible with the selected at least one of the one or more stored selected programs such that the selected at least one of the one or more stored selected programs is executable utilizing the client PC.

2. The method of claim 1, wherein run the launched at least one of the one or more stored selected programs includes:

delete the updated registry entries and .dll files copied to the client PC;

restore the original registry entries to the client PC from the temporary files on the MSD or the client PC; and delete the temporary files stored on the MSD or the client PC.

3. The method of claim 1, wherein the MSD is a storage device selected from a group consisting of an external hard drive, an external flash memory, a personal digital assistant, a cell phone, and a multimedia player.

4. The method of claim 1, wherein the MSD further includes wireless or wired network capabilities.

5. The method of claim 1, wherein the MSD is preloaded with predetermined programs and applications.

6. The method of claim 1, wherein the executing using the processor of the client PC includes executing instructions stored on the MSD.

7. The method of claim 1, wherein the executing using the processor of the client PC includes executing instructions stored on the MSD and stored on the client PC.

8. A system for providing mobility to a personal computer ("PC") of a user ("user PC") via a mobile storage device ("MSD") and a client PC, the client PC being distinct from and remotely located from the user PC, the system comprising:

a processor of the user PC for executing instructions stored in a memory thereof to:
    receive a selection from the user via the user PC of one or more programs installed on the user PC; and
    store the selected one or more programs on the MSD including:
        determine whether the selected one or more programs require registry entries or custom user settings stored in a registry or dynamic link library (".dll") files on the user PC, and
        if the selected one or more programs have registry entries or custom user settings stored in the registry or .dll files, store the registry entries or custom user settings and .dll files in a database on the MSD to enable the selected one or more programs to be executed utilizing the client PC as if the selected one or more programs were installed on the client PC;

a processor of the client PC for executing instructions stored in a memory thereof to, in response to the MSD being interfaced with the client PC by the user:

receive a selection from the user via the client PC of at least one of the one or more selected programs stored on the MSD to launch;

launch the selected at least one of the one or more selected programs stored on the MSD, said launch including determine if registry entries and .dll files are required to run the selected at least one of the one or more selected programs stored on the MSD, and if registry entries are required:

update the registry entries stored on the MSD for compatibility with the client PC;

copy original registry entries from the client PC to temporary files on the MSD or the client PC, the access privileges of the user for the client PC permitting the copying of the original registry entries from the client PC; and copy the updated registry entries and the .dll files stored on the MSD to the client PC, the access privileges of the user for the client PC permitting the copying of the updated registry entries and .dll files to the client PC; and run the launched at least one of the one or more stored selected programs utilizing the client PC, the client PC being compatible with the selected at least one of the one or more stored selected programs such that the selected at least one of the one or more stored selected programs is executable utilizing the client PC; and the MSD being configured to store the selected one or more programs and further configured to store the registry entries or custom user settings and .dll files in the database on the MSD if the selected one or more programs have registry entries or custom user settings stored in the registry or .dll files.

9. The system of claim 8, wherein run the launched at least one of the one or more stored selected programs includes:

delete the updated registry entries and .dll files copied to the client PC;

restore the original registry entries to the client PC from the temporary files on the MSD or the client PC; and delete the temporary files stored on the MSD or the client PC.

10. The system of claim 8, wherein the MSD is a storage device selected from a group consisting of an external hard drive, an external flash memory, a personal digital assistant, a cell phone, and a multimedia player.

11. The system of claim 8, wherein the MSD further includes wireless or wired network capabilities.

12. The system of claim 8, wherein the MSD is preloaded with predetermined programs and applications.

13. The system of claim 8, wherein the instructions executed by the processor of the client PC are stored on the MSD.

14. The system of claim 8, wherein a portion of the instructions executed by the processor of the client PC are stored on the MSD and the remaining portion of the instructions executed by the processor of the client PC are stored on the client PC.

* * * * *